(12) United States Patent
Richardson

(10) Patent No.: US 9,186,016 B2
(45) Date of Patent: Nov. 17, 2015

(54) COFFEE PRESS APPARATUS

(71) Applicant: John Richardson, Coupeville, WA (US)

(72) Inventor: John Richardson, Coupeville, WA (US)

( * ) Notice: Subject to any disclaimer, the term of this patent is extended or adjusted under 35 U.S.C. 154(b) by 0 days.

(21) Appl. No.: 14/011,889

(22) Filed: Aug. 28, 2013

(65) Prior Publication Data
US 2015/0059592 A1   Mar. 5, 2015

(51) Int. Cl.
*A47J 31/18*   (2006.01)
*A47J 31/20*   (2006.01)
*A47J 31/06*   (2006.01)

(52) U.S. Cl.
CPC .............. *A47J 31/20* (2013.01); *A47J 31/0615* (2013.01); *A47J 31/18* (2013.01)

(58) Field of Classification Search
CPC ....... A47J 31/14; A47J 31/38; A47J 31/3671; A47J 31/36; A47J 31/0615; A47J 31/20
USPC .............. 99/279, 281, 282, 289 D, 297, 298; 426/431, 433, 425, 330
See application file for complete search history.

(56) References Cited

U.S. PATENT DOCUMENTS

| | | | | |
|---|---|---|---|---|
| 2,749,834 | A | * | 6/1956 | Hiscock ........................... 99/287 |
| 5,979,299 | A | * | 11/1999 | Hornsby et al. ................. 99/297 |
| 6,561,080 | B1 | | 5/2003 | Feeney |
| D571,610 | S | * | 6/2008 | Bodum ........................... D7/399 |
| 7,849,784 | B2 | * | 12/2010 | Adler ............................... 99/297 |
| 8,695,485 | B2 | * | 4/2014 | Spitzley et al. ................. 99/297 |
| 2011/0014340 | A1 | | 1/2011 | Spitzley et al. |
| 2011/0097465 | A1 | * | 4/2011 | Bishop et al. ................. 426/431 |
| 2013/0160655 | A1 | * | 6/2013 | Chen ........................ A47J 31/18 99/299 |
| 2014/0205725 | A1 | * | 7/2014 | Albanese ................ A47J 31/20 426/433 |

* cited by examiner

*Primary Examiner* — Nina Bhat

(57) ABSTRACT

An apparatus comprises a vessel comprising an open top, an open bottom, and a wall. The vessel encompasses a volume of material and fluid. A bottom assembly removably engages the open bottom. A lid assembly removably engages the open top. A plunger unit comprises a top end and a bottom end. The plunger unit passes through the lid assembly to extend to at least the open bottom. A filter assembly is in engagement with the bottom end and the cylinder wall. The filter assembly substantially separates the material and fluid with a movement of the plunger unit towards the open bottom and compresses the material against the bottom assembly. The separated fluid is removable from the open top, and the compressed material is removable by a disengagement of the bottom assembly and continued movement of the filter assembly towards the open bottom.

20 Claims, 6 Drawing Sheets

COFFEE PRESS APPARATUS

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to coffee brewing devices. More particularly, the invention relates to a coffee press that may be easily cleaned.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. A French Press style coffee press is a coffee and tea brewing vessel which often comprises a cylinder with a fixed bottom, an open top, and a lid supporting an operating rod connected to a filter disk or screen. In typical use of such a coffee press, brewing usually involves placing ground coffee, tea, or other material inside the vessel, pouring hot water into the vessel, optionally stirring, and waiting an appropriate brewing time. When brewing is complete, the lid is typically placed on top of the vessel with the operating rod in the fully outward or up position. Then, the rod may be pressed downward so that the filter disk moves through the water and ground material, which generally results in pressing the ground material to the bottom of the vessel. The brewed coffee, tea or other beverage may then be poured off while the filter disk typically keeps the spent brewing material at the bottom of the vessel and separated from the liquid. When brewing is done one may expect that the brewing vessel may need to be cleaned by removing the spent brewing material. Typically, the material becomes a moist, packed "puck" which adheres to the bottom and sides of the brewing vessel and may be hard to remove. The removal of spent material in current French Presses may require the removal of the lid with the operating rod and filter disk and then a manual cleaning of the spent brewing material with a long handled spoon, scraping, flushing, or other removal techniques.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that there are currently some methods and devices to aid in cleaning existing coffee presses. For example, without limitation, some coffee presses comprise an additional disk on the bottom to dislodge spent material that may be operated by multiple rods, tabs, string, etc. Additional cleaning aids may involve the placement of a cup, filter, or other mechanism on the bottom of the coffee press to assist in dislodging the grounds. One exemplary prior art coffee press reverses the traditional French Press so that removal of the grounds may be achieved through the top of the press by the activation of a driven filter plate in a sealed chamber. Further currently available cleaning aids include, without limitation, an external tool to assist in cleaning that operates similarly to an auger or other external cleaning tools such as, but not limited to, cleaning brushes, sponges with extendable handles, scraping utensils, etc.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a diagrammatic side view of the coffee press in an empty state. FIG. 1B is a diagrammatic side view of the coffee press full of brewing material, and FIG. 1C is a diagrammatic side view of the coffee press with the bottom removed;

Figure 1A:
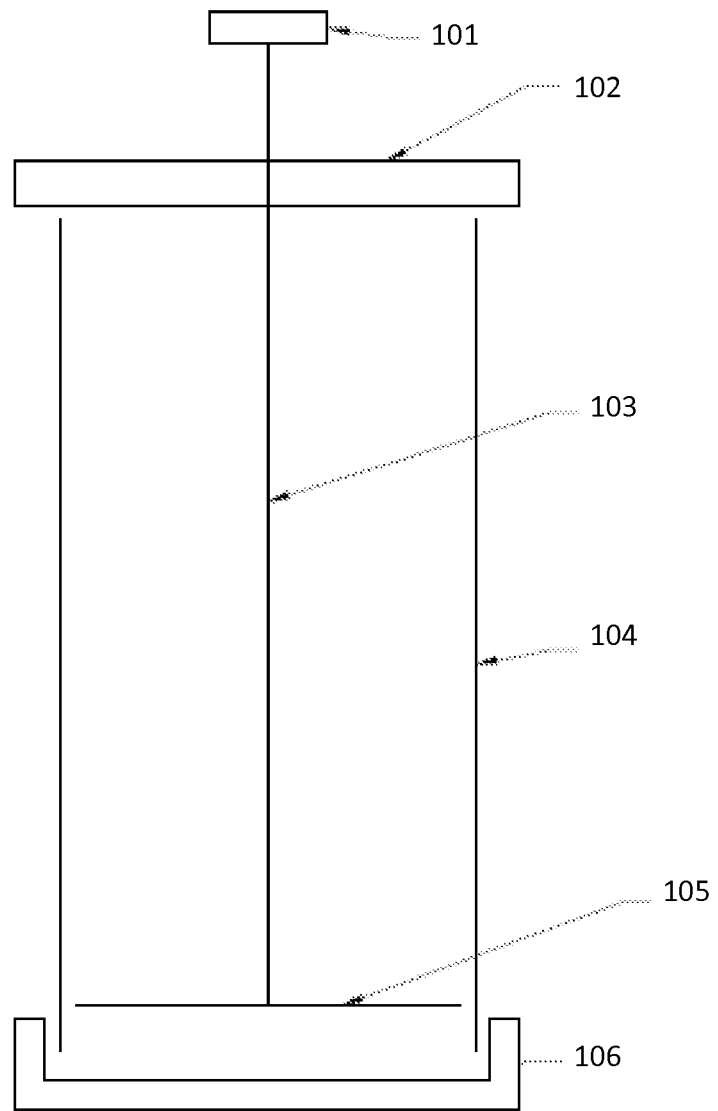
FIGS. 1A through 1C illustrate an exemplary coffee press with a removable bottom, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

One embodiment of the present invention may provide a French Press style coffee press that comprises means to aid in easy clean up and removal of spent material. Some embodiments may comprise a removable bottom through which spent material may be pushed by a filter disk and plunger rod. Some embodiments may be implemented into various types of brewing devices including, without limitation, automatic coffee makers, commercial coffee brewing systems, home coffee brewing systems, spice infusers, tea infusers, other types of infusion makers, kitchen baking devices, mixing appliances, chemical processing, etc.

Figure 1B:
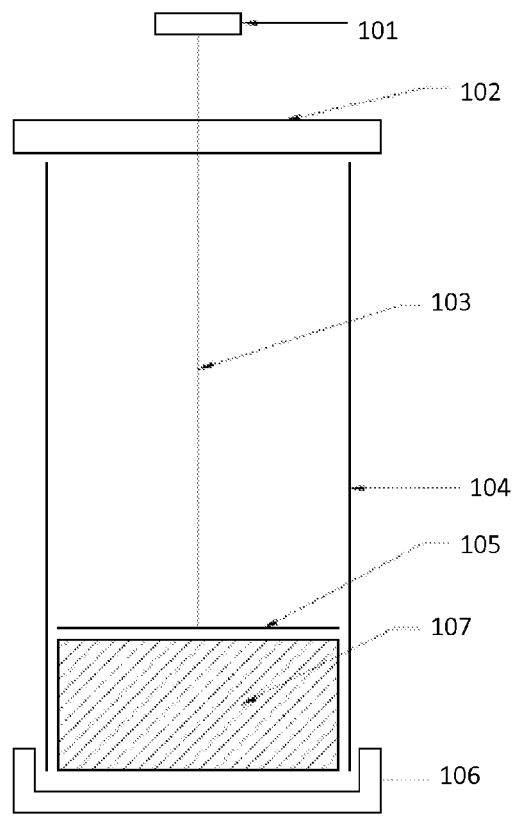
Figure 1C:
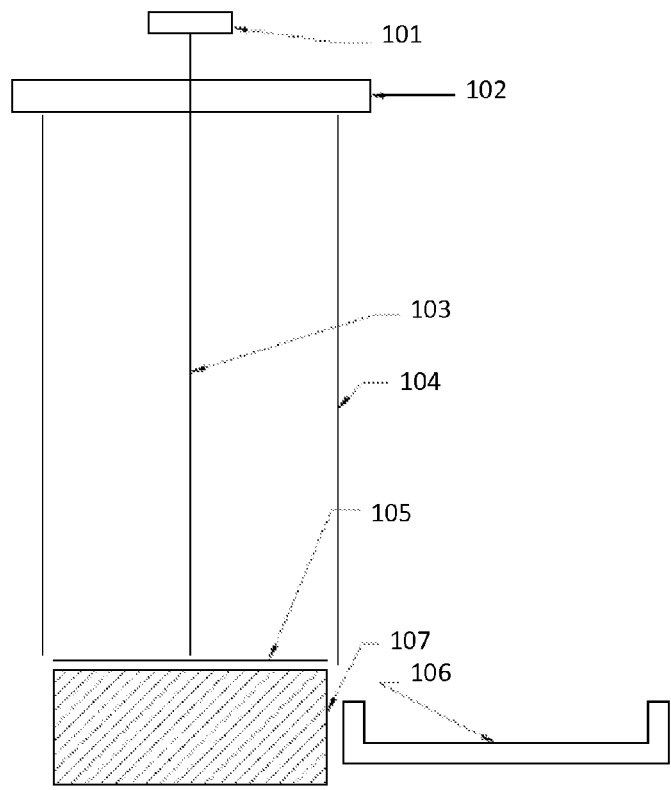

FIGS. 1A through 1C illustrate an exemplary coffee press with a removable bottom 106, in accordance with an embodiment of the present invention. FIG. 1A is a diagrammatic side view of the coffee press in an empty state. FIG. 1B is a diagrammatic side view of the coffee press full of brewing material 107, and FIG. 1C is a diagrammatic side view of the coffee press with bottom 106 removed. In the present embodiment, the coffee press comprises a brewing vessel 104 that may be used to hold water and brewing material 107. Brewing vessel 104 may be a cylinder that is open on both ends with a cap 102 on the top and removable bottom 106. It is contemplated that brewing vessels in some alternate embodiments may have various different shapes such as, but not limited to, rectangular or square tubes. Furthermore, the brewing vessel may be insulated or not insulated, and may be made from a multiplicity of suitable materials compatible with brewing with hot water such as, but not limited to, stainless steel, chromed steel, many plastics, glass, etc. In the present embodiment, cap 102 aids in preventing the contents of brewing vessel 104 from spilling yet is removable to typically allow for pouring the contents from brewing vessel 104. Cap 102 also may support a plunger rod 103, which may be used to actuate a filter disk 105. The length of plunger rod 103 is typically long enough to push filter disk 105 to at least even with the bottom of brewing vessel 104 or past the bottom of brewing vessel 104 so that filter disk 105 may be able to pass all the way through brewing vessel 104. Filter disk 105 may comprise a screen, perforations, mesh, or paper and presses against the side of brewing vessel 104 to create a seal between brewing vessel 104 and filter disk 105. Some embodiments may comprise additional means for sealing the connection between the filter disk and the brewing vessel such as, but not limited to, a rubber edge on the filter disk. In the present embodiment, plunger rod 103 is attached to cap 102. In some embodiments the plunger rod may be attached to other types of devices to locate and hold the plunger rod 103 in place while in operation such as, but not limited to, a wire guide, a rod, a guide disk, etc. In the present embodiment, plunger rod 103 comprises an operating knob 101 that may be used to push filter disk 105 through brewing vessel 104 and any brewing material contained within. As filter disk 105 is pushed through brewing vessel 104, filter disk 105 typically separates brewing material 107 from the infused water. Knob 101 may also be used to continue pushing filter disk 105 and spent brewing material 107 out through the bottom of brewing vessel 104 when bottom 106 is removed after brewing is complete for cleaning. Those skilled in the art will readily recognize, in light of and in accordance with the teachings of the present invention, that a multiplicity of suitable means may be used to push the filter disk through the brewing vessel. For example, without limitation, in some embodiments the filter rod may be screw thread operated rather than push operated. In some embodiments, the plunger rod may be operated by knobs of various different shapes and sizes or various different types of mechanisms such as, but not limited to, cranks, buttons, levers, etc.

In the present embodiment, removable bottom 106 may enable spent brewing material 107 to be removed after brewing. When brewing, removable bottom 106 is attached to brewing vessel 104 by a screw mechanism similar to a jar lid. It is contemplated that various different attachment means may be used to attach the removable bottom to the brewing vessel in some embodiments such as, but not limited to, mechanical clamps, bales, a cam arrangement, or by containing the brewing vessel within another vessel, container, or brewing machine that provides mechanical pressure. In the present embodiment, when attached to brewing vessel 104, removable bottom 106 creates a seal to generally prevent liquid from leaking from brewing vessel 104. Some embodiments may also comprise a supplemental seal made of a water resistant material such as, but not limited to, plastic or silicon rubber. In the present embodiment, removable bottom 106 comprises a flat surface that faces the inside of brewing vessel 104. Some embodiments may be implemented with a projection on the side of the removable bottom facing the inside of the brewing vessel to aid in the removal of the brewing material contained in the brewing vessel. The projection may be configured such that the brewing material is retained within the brewing cylinder when the bottom is removed. This allows the filter screen when actuated by the operating rod to push all of the material in to a waste receptacle. As a non-limiting example, if the bottom was "dished" or "cupped" in some way, some material may be left behind that would require a more mechanical removal process. Those skilled in the art will readily recognize, in light of and in accordance with the teachings of the present invention, that a multiplicity of suitable means may be used to create a removable or repositionable bottom for a coffee press. For example, without limitation, the bottom of the brewing vessel may be formed by a sliding member, a plunger, or another mechanism as part of a brewing machine. In other embodiments, the bottom may be created by a piston which, when inserted into the brewing vessel, seals the bottom of the vessel and, when retracted, opens the vessel for grounds removal.

Referring to FIG. 1B, brewing vessel 104 is shown with removable bottom 106 installed on the bottom and brewing material 107 contained within. Referring to FIG. 1C, brewing vessel 104 is shown with removable bottom 106 removed, allowing brewing material 107 to be removed from brewing vessel 104. In typical use of the present embodiment, a user adds brewing material 107 such as, but not limited to, ground coffee, tea, spices, etc. and hot, warm, or cold water determined by the type of beverage being brewed to a top opening of brewing vessel 104 with bottom 106 attached. Optionally, the user may stir or mix the water and brewing material 107 combination and then waits until the mixture is diffused or brewed or the time appropriate to the recipe for the beverage. When brewing is done, the user may place cap 102, with plunger rod 103 and filter disk 105 attached, to the top of brewing vessel 104 and push filter disk 105 through the liquid and brewing material 107 with plunger rod 103 until filter disk 105 sits on top of brewing material 107 as illustrated by way of example in FIG. 1B. The user may then pour off the beverage until all of the liquid has been removed.

To clean brewing vessel 104, the user may hold brewing vessel 104 over a waste container and remove bottom 106. The user may then push plunger rod 103 with knob 101 until filter disk 105 is in a material removal position 105 as illustrated by way of example in FIG. 1C. This pushes brewing material 107 out the bottom of brewing vessel 104 so that brewing material 107 may fall into the waste container. Typically brewing material 107 slides cleanly out of brewing vessel 104 as a compressed "puck". Moreover, filter disk 105 may also provide a wiping action that may aid in cleaning any remaining material from the walls of brewing vessel 104. Plunger rod 103 is typically of sufficient length to facilitate the direct pushing through of brewing material 107 from brewing vessel 104. In some embodiments, the coffee press may comprise a shorter plunger rod, and the user may use an external tool, shaking, etc. to aid in removing the brewing material. In the present embodiment, once brewing material is emptied from brewing vessel 104, filter disk 105, plunger rod 103, and cap 102 may be removed from brewing vessel 104 to be washed using any appropriate method. Brewing vessel 104 is now open at both ends, which may provide unobstructed access to either end and may enable a cleaning brush or sponge to pass all the way through brewing vessel 104 for easy cleaning. If desired, the user may reuse the coffee press by re-attaching removable bottom 106 to brewing vessel 104 and repeating the brewing procedure.

The present embodiment may be used in a variety of different environments such as but not limited to, a home kitchen, a coffee café, a restaurant, etc. The present embodiment may enable the user to quickly clean the coffee press, typically with less mess than with current coffee presses since brewing material 107 generally may be removed as a unit directly over a waste container. Furthermore, the open cylinder of brewing vessel 104 typically allows for easy cleaning, brushing, wiping, cleaning in a dishwasher, etc. The ease of cleaning may enable a user to more quickly complete a brewing cycle, which may be desirable in a high production environment such as, but not limited to, a coffee shop or restaurant.

Figure 2:
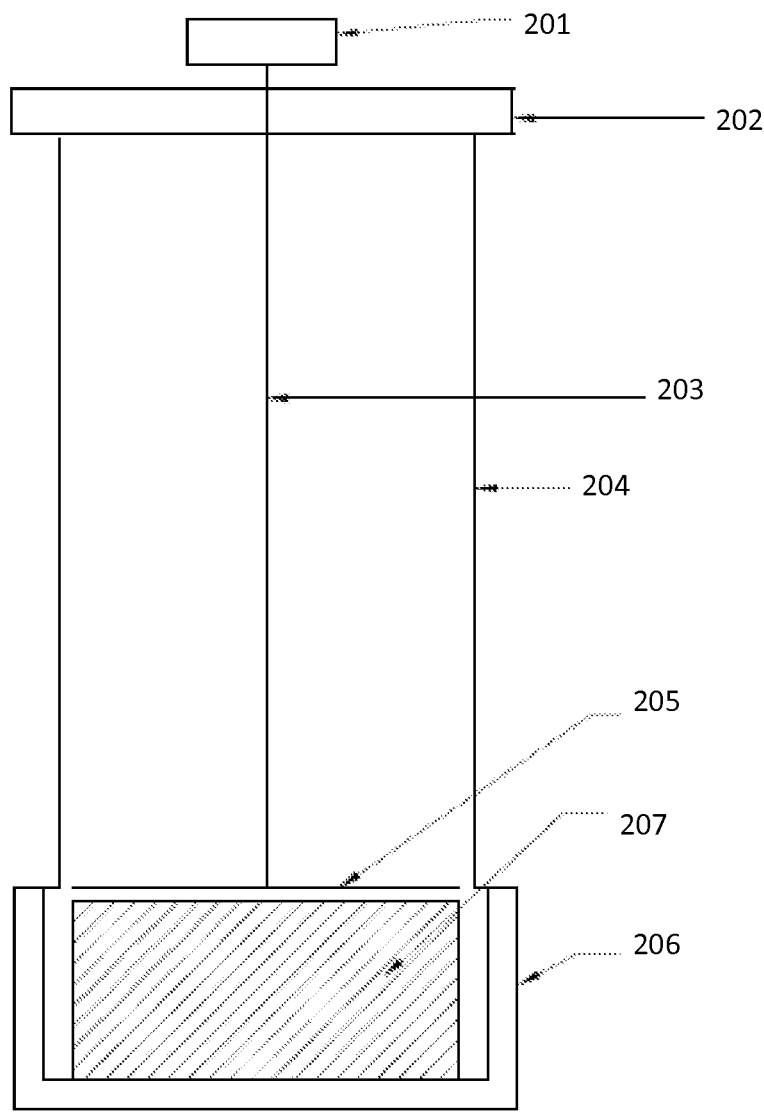
FIG. 2 is a diagrammatic side view of an exemplary coffee press with a cupped removable bottom, in accordance with an embodiment of the present invention.

FIG. 2 is a diagrammatic side view of an exemplary coffee press with a cupped removable bottom 206, in accordance with an embodiment of the present invention. In the present embodiment, the coffee press comprises a plunger rod 203 with a filter disk 205 and a knob 201. Plunger rod 203 is inserted into a brewing vessel 204 and may be supported by a cap 202. Filter disk 205 is shown even with the lower portion of brewing vessel 204 so that brewing material 207 is pushed into removable bottom 206. In the present embodiment, removable bottom 206 has a cupped shape of sufficient size to typically contain all of brewing material 207 for disposal, rather than having brewing material 207 in brewing vessel 204. Once a user has finished brewing in the coffee press and pushes brewing material 207 into removable bottom 206, bottom 206 may be removed and independently brought to a waste receptacle for disposal of brewing materials 207 or may be saved for later disposal. Cupped removable bottom 206 may be part of the bottom of brewing vessel 204 or may be a separate container. It is contemplated that a multiplicity of suitable means may be used to attach cupped bottom 206 to brewing vessel 204 such as, but not limited to, a threaded connection, friction, clasps, etc.

Figure 3:
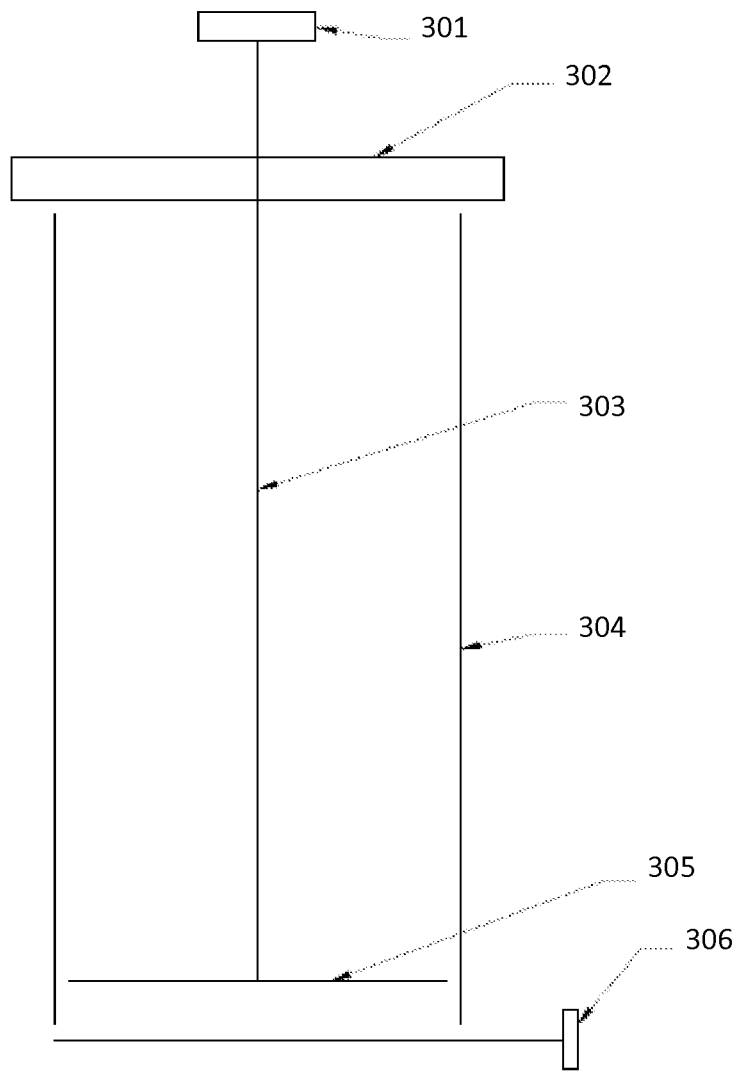
FIG. 3 is a diagrammatic side view of an exemplary coffee press with a sliding bottom, in accordance with an embodiment of the present invention.

FIG. 3 is a diagrammatic side view of an exemplary coffee press with a sliding bottom 306, in accordance with an embodiment of the present invention. In the present embodiment, the coffee press comprises a brewing vessel 304 with a cap 302 supporting a plunger rod 303 with a knob 301. Plunger rod 303 may be used to operate a filter disk 305. Sliding bottom 306 may be used to create a sealed bottom for brewing, and then may be moved for disposal of spent brewing materials. Such a mechanism may be suitable for providing automated coffee machinery with a movable bottom. In some embodiments sliding bottoms may be connected to brewing vessels using various different mechanisms and in various different configurations. For example, without limitation, a sliding bottom may be slid back and forth within a channel in the bottom of the brewing vessel. Alternatively, a sliding bottom may be pivotally attached to the bottom of the brewing vessel so that the bottom may be rotated away from the brewing vessel for removal of brewing material and rotated back toward the brewing vessel to close the bottom.

Figure 4:
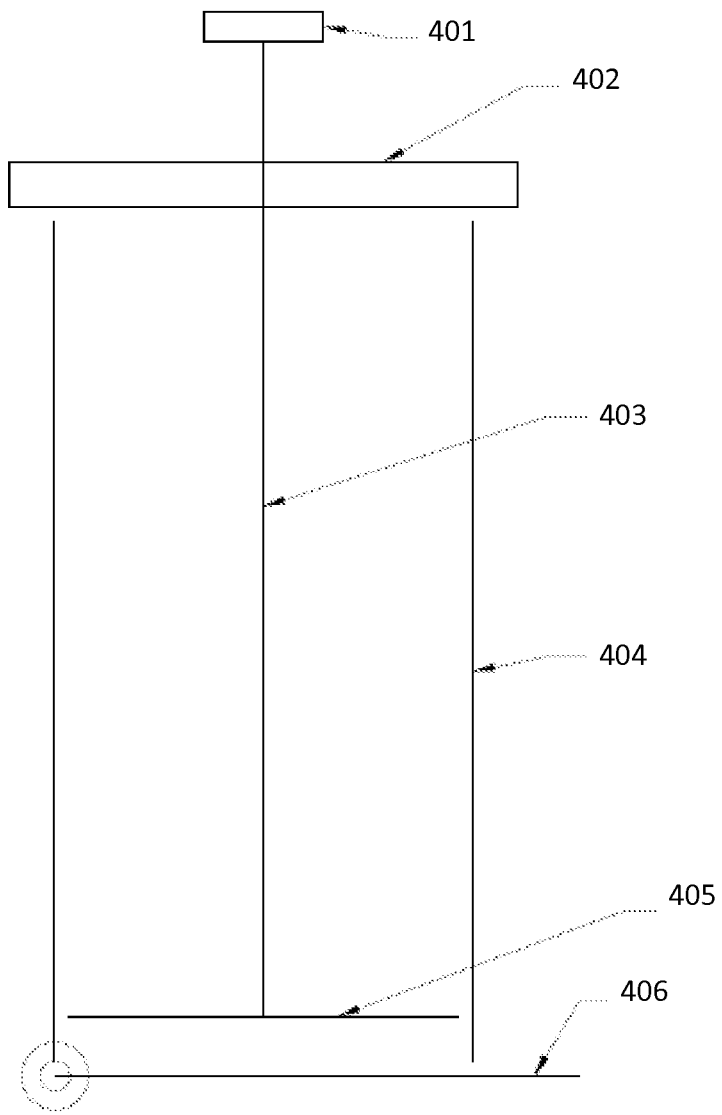
FIG. 4 is a diagrammatic side view of an exemplary coffee press with a hinged bottom, in accordance with an embodiment of the present invention.

FIG. 4 is a diagrammatic side view of an exemplary coffee press with a hinged bottom 406, in accordance with an embodiment of the present invention. In the present embodiment, the coffee press comprises a brewing vessel 404, a cap 402, and a plunger rod 403 with a knob 401 and a filter disk 405. Hinged bottom 406 typically creates a sealed bottom for brewing, and then may be opened for disposal of spent brewing materials. A multiplicity of suitable means may be used to hold hinged bottom 406 in the closed position including, without limitation, clasps, friction, a snap closure, etc. Such a mechanism may be suitable for use in automated coffee machinery.

Figure 5:
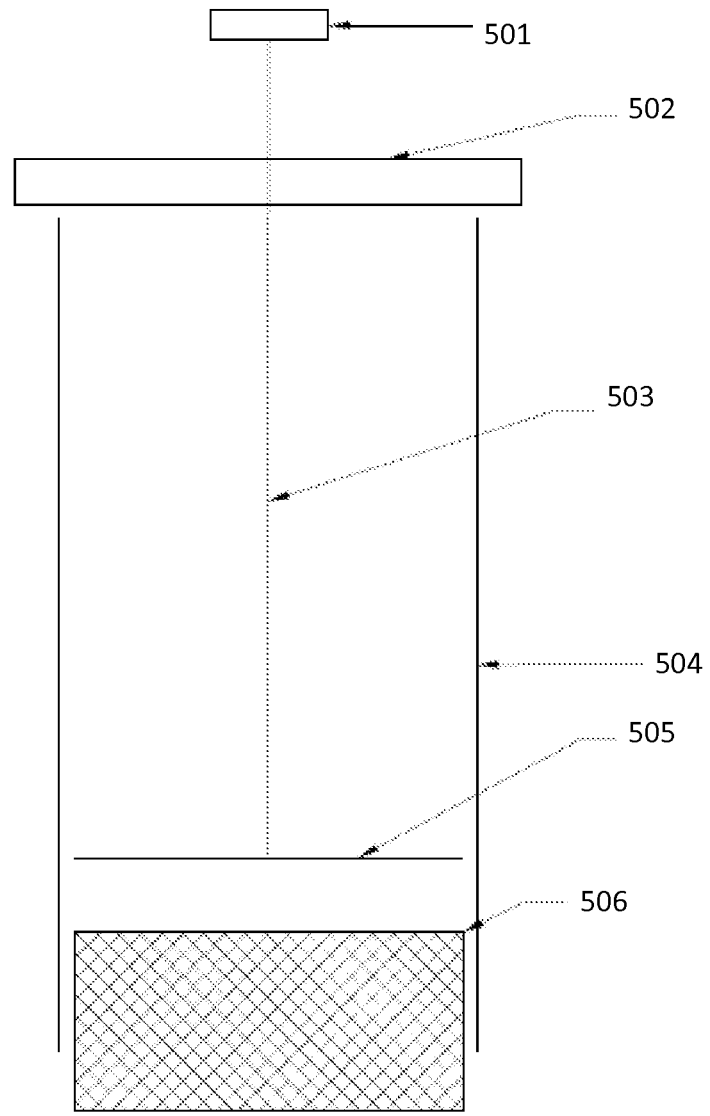
FIG. 5 is a diagrammatic side view of an exemplary coffee press with a piston bottom, in accordance with an embodiment of the present invention.

FIG. 5 is a diagrammatic side view of an exemplary coffee press with a piston bottom, in accordance with an embodiment of the present invention. In the present embodiment, the coffee press comprises a brewing vessel 504, a cap 502, and a plunger rod 503 with a knob 501 and a filter disk 505. Piston bottom 506 may be used to create a sealed bottom for brewing and then may be retracted for disposal. In a non-limiting example the piston may be operated with a connecting rod, similar to a reciprocating piston engine/compressor. The connecting rod may be mounted to a rotary crank shaft, linear actuator, etc. Another non-limiting method of operation of the piston may include the piston being contained within the cylinder and being operated upon by a fluid medium such as water or air. In this case bottom "ports" would be uncovered to allow material cleanout when the piston is in its most retracted position, and the ports are covered, sealing the ports, when the piston is extended into the cylinder. Such a mechanism may be suitable for use in automated coffee machinery.

Those skilled in the art will readily recognize, in light of and in accordance with the teachings of the present invention, that alternate embodiments of the present invention may be implemented in various different configurations. For example, without limitation, one embodiment may be made of a large mouth, single walled insulated bottle with an open top in which the bottom may be screwed onto or off of the bottle in a configuration that creates a water tight seal. Some such embodiments may comprise silicone rubber seals or other types of seals. Other such embodiments may comprise a screw seal at each end. Some embodiments may comprise a removable insert to hold the brewing material. Some embodiments may be implemented as a container within a container. Another embodiment may comprise a movable disk connected to a co-axial operating rod that may be used to pull brewing material out of the coffee press after brewing. Yet another embodiment may comprise a water activated piston on the bottom which rises to the top of the coffee press under water pressure to bring the brewing material to the top of the brewing vessel. Other embodiments may be implemented as upgrade kits for existing coffee presses. It is contemplated that a multiplicity of suitable features may be included without limitation in some embodiments such as, but not limited to, a pouring spout, a removable or permanent handle, measurement indicators, a timer, insulated areas, etc.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing a coffee press that may be easily cleaned according to the present invention will be apparent to those skilled in the art. Various aspects of the invention have been described above by way of illustration, and the specific embodiments disclosed are not intended to limit the invention to the particular forms disclosed. The particular implementation of the coffee press may vary depending upon the particular context or application. By way of example, and not limitation, the coffee presses described in the foregoing were principally directed to implementations in which the brewing material is removed from the bottom; however, similar techniques may instead be applied to devices in which the brewing material is removed from the top or side, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Apparatus elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the apparatus below are intended to include any structure, material, or act for performing the function in combination with other elements in the apparatus.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the following apparatus. The following apparatus are hereby incorporated into the detailed description, with each apparatus standing on its own as a separate embodiment.

What is claimed is:

1. An apparatus comprising:
   a vessel comprising an open top side portion, an open bottom side portion, and a cylinder wall section, said vessel being configured to at least encompass a volume of material and a volume of fluid;
   a top assembly, said top assembly comprising a removable top assembly, said removable top assembly further comprising a lid assembly being configured to removably engage said open top side portion, wherein said removable top assembly being operable to prevent said volume of fluid and volume of material from spilling;
   a bottom assembly, said bottom assembly comprising a removable bottom assembly being configured to removably engage said open bottom side portion to seal said open bottom side portion, wherein said removable bottom assembly being operable to ease cleaning of spent volume of material;
   a plunger unit comprising a top end segment and a bottom end segment, said plunger unit being configured to movably pass through said lid assembly to extend said bottom end segment to at least said open bottom side portion, said plunger unit comprising a handle assembly to facilitate said movement of said plunger unit; and
   a filter assembly in engagement with said bottom end segment and said cylinder wall section, said filter assembly being configured to substantially separate the volume of material and the volume of fluid with a movement of said plunger unit towards said open bottom side portion and to compress the volume of material against said bottom assembly, the separated volume of fluid being removable by a disengagement of said removable top assembly from said open top side portion and pouring said separated volume of fluid out of said open top side portion, and the compressed volume of material being removable by a disengagement of said removable bottom assembly and a continued movement of said filter assembly towards said open bottom side portion to push said volume of material out of said open bottom side portion.

2. The apparatus as recited in claim 1, in which said volume of material is a brewing material comprising at least one of coffee and tea.

3. The apparatus as recited in claim 1, in which said filter assembly further comprises a planar element for said separation.

4. The apparatus as recited in claim 1, in which said bottom assembly further comprises a receptacle for the compressed volume of material.

5. The apparatus as recited in claim 1, in which said bottom assembly is configured for rotatable engagement with said open bottom side portion.

6. The apparatus as recited in claim 5, in which said rotatable engagement comprises a screw like function.

7. The apparatus as recited in claim 5, in which said rotatable engagement comprises a hinge like function.

8. The apparatus as recited in claim 1, in which said bottom assembly is configured for slidable engagement with said open bottom side portion.

9. The apparatus as recited in claim 1, in which said bottom assembly further comprises a piston being configured to engage said cylinder wall section.

10. The apparatus as recited in claim 1, in which said vessel further comprises a proximate circular profile.

11. The apparatus as recited in claim 1, in which the apparatus is further configured for brewing the volume of material comprising brewing material with the volume of fluid comprising hot water.

12. An apparatus comprising:
    a vessel comprising an open top side portion, an open bottom side portion, and a wall section, said vessel being configured for at least encompassing a volume of brewing material and a volume of fluid;
    means being configured for removably engaging said open bottom side portion and for sealing said open bottom side portion, wherein said open bottom side portion engaging means being operable to ease cleaning of spent volume of material;
    means being configured for removably engaging said open top side portion and being operable to prevent said volume of fluid and volume of material from spilling;
    means being configured for movably passing through said open top side engaging means for extending at least said open bottom side; and
    means being configured for substantially separating the volume of material and the volume of fluid with a movement of said passing and extending means towards said open bottom side portion and for compressing the volume of material against said open bottom side portion engaging means, the separated volume of fluid being removable by a disengagement of said open top engaging means from said open top side portion and pouring said separated volume of fluid out of said open top side, and the compressed volume of material being removable by a disengagement of said open bottom side portion engaging means and continued movement of said separating means towards said open bottom side portion to push said volume of material out of said open bottom side.

13. The apparatus as recited in claim 12, further comprising means being configured for facilitating movement of said passing and extending means.

14. An apparatus comprising:
    a vessel comprising an open top side portion, an open bottom side portion, a cylinder wall section, said vessel being configured to at least encompass a brew comprising a volume of brewing material and a volume of hot water;
    a bottom assembly, said bottom assembly comprising a removable bottom assembly being configured to removably engage said open bottom side portion to seal said open bottom side portion, wherein said removable bottom assembly being operable to ease cleaning of spent volume of material;

a top assembly, said top assembly comprising a removable top assembly, said removable top assembly further comprising a removable lid assembly being configured to removably engage said open top side portion to prevent said volume of brewing material and volume of hot water from spilling;

a plunger unit comprising a top end segment and a bottom end segment, said plunger unit being configured to movably pass through said lid assembly to extend said bottom end segment to at least said open bottom side portion;

a handle assembly in engagement with said top end segment to facilitate movement of said plunger unit; and a filter assembly in engagement with said bottom end segment and said cylinder wall section, said filter assembly being configured to substantially separate the brewing material from the brew with a movement of said plunger unit towards said open bottom side portion and to compress the brewing material against said bottom assembly, said filter assembly further comprising a planar element for said separation and said compression, the separated brew being removable by a disengagement of said removable top assembly from said open top side portion and pouring said separated volume of fluid out of said open top side, and the compressed brewing material being removable by a disengagement of said bottom assembly and continued movement of said filter assembly towards said open bottom side portion to push said volume of material out of said open bottom side.

15. The apparatus as recited in claim 14, in which said bottom assembly further comprises a receptacle for the compressed brewing material.

16. The apparatus as recited in claim 14, in which said bottom assembly is configured for rotatable engagement with said open bottom side portion.

17. The apparatus as recited in claim 16, in which said rotatable engagement comprises a screw like function.

18. The apparatus as recited in claim 16, in which said rotatable engagement comprises a hinge like function.

19. The apparatus as recited in claim 14, in which said bottom assembly is configured for slidable engagement with said open bottom side portion.

20. The apparatus as recited in claim 14, in which said bottom assembly further comprises a piston being configured to engage said cylinder wall section.

\* \* \* \* \*